US008108196B2

(12) United States Patent
Armstrong et al.

(10) Patent No.: US 8,108,196 B2
(45) Date of Patent: *Jan. 31, 2012

(54) SYSTEM FOR YIELDING TO A PROCESSOR

(75) Inventors: William Joseph Armstrong, Mantorville, MN (US); Chris Francois, St. Paul, MN (US); Naresh Nayer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 12/174,954

(22) Filed: Jul. 17, 2008

(65) Prior Publication Data

US 2008/0276246 A1    Nov. 6, 2008

Related U.S. Application Data

(63) Continuation of application No. 09/939,232, filed on Aug. 24, 2001, now Pat. No. 7,428,485.

(51) Int. Cl.
*G06F 9/44*  (2006.01)
*G06F 13/10* (2006.01)
*G06F 13/12* (2006.01)

(52) U.S. Cl. ........................................ 703/21
(58) Field of Classification Search .................. 703/20, 703/21; 718/102, 106
See application file for complete search history.

(56) References Cited

U.S. PATENT DOCUMENTS

| | | | |
|---|---|---|---|
| 4,400,769 A | 8/1983 | Kaneda et al. | |
| 4,742,447 A | 5/1988 | Duvall et al. | |
| 4,843,541 A | 6/1989 | Bean et al. | |
| 5,095,427 A | 3/1992 | Tanaka et al. | |
| 5,187,802 A | 2/1993 | Inoue et al. | |
| 5,325,525 A | 6/1994 | Shan et al. | |
| 5,325,526 A | 6/1994 | Cameron et al. | |
| 5,357,632 A | 10/1994 | Pian et al. | |
| 5,361,375 A | 11/1994 | Ogi | |
| 5,404,563 A | 4/1995 | Green et al. | |
| 5,481,747 A | 1/1996 | Kametani | |
| 5,504,670 A | 4/1996 | Barth et al. | |
| 5,535,321 A | 7/1996 | Massaro et al. | |
| 5,574,914 A | 11/1996 | Hancock et al. | |
| 5,640,584 A | 6/1997 | Kandasamy et al. | |
| 5,659,786 A | 8/1997 | George et al. | |
| 5,692,193 A | 11/1997 | Jagannathan et al. | |
| 5,694,606 A | 12/1997 | Pletcher et al. | |
| 5,872,963 A | 2/1999 | Bitar et al. | |

(Continued)

FOREIGN PATENT DOCUMENTS

JP            62163149           7/1987

(Continued)

OTHER PUBLICATIONS

David L. Black, "Scheduling Support for Concurrency and Parallelism in the Mach Operating System," Computer, IEEE Computer Society, vol. 23, No. 5, May 1, 1990, pp. 35-43.

(Continued)

*Primary Examiner* — Dwin M Craig
*Assistant Examiner* — Aniss Chad
(74) *Attorney, Agent, or Firm* — Wood, Herron & Evans

(57) ABSTRACT

An apparatus and program product for coordinating the distribution of CPUs as among logically-partitioned virtual processors. A virtual processor may yield a CPU to precipitate an occurrence upon which its own execution may be predicated. As such, program code may dispatch the surrendered CPU to a designated virtual processor.

10 Claims, 3 Drawing Sheets

U.S. PATENT DOCUMENTS

| | | | |
|---|---|---|---|
| 5,898,855 | A | 4/1999 | Onodera et al. |
| 5,978,830 | A | 11/1999 | Nakaya et al. |
| RE36,462 | E | 12/1999 | Chang et al. |
| 6,078,970 | A | 6/2000 | Nordstrom et al. |
| 6,105,050 | A | 8/2000 | Govindaraju et al. |
| 6,195,676 | B1 | 2/2001 | Spix et al. |
| 6,199,093 | B1 | 3/2001 | Yokoya et al. |
| 6,247,109 | B1 | 6/2001 | Kleinsorge et al. |
| 6,269,391 | B1 | 7/2001 | Gillespie |
| 6,279,046 | B1 | 8/2001 | Armstrong et al. |
| 6,381,742 | B2 | 4/2002 | Forbes et al. |
| 6,418,460 | B1 | 7/2002 | Bitar et al. |
| 6,487,654 | B2 | 11/2002 | Dowling |
| 6,542,926 | B2 | 4/2003 | Zalewski et al. |
| 6,587,938 | B1 | 7/2003 | Eilert et al. |
| 6,598,069 | B1 | 7/2003 | Rooney et al. |
| 6,615,303 | B1 | 9/2003 | Endo et al. |
| 6,625,638 | B1 | 9/2003 | Kubala et al. |
| 6,647,508 | B2 | 11/2003 | Zalewski et al. |
| 6,711,605 | B2 | 3/2004 | Sekiguchi et al. |
| 6,760,783 | B1 | 7/2004 | Berry |
| 6,779,065 | B2 | 8/2004 | Murty et al. |
| 6,912,493 | B1 | 6/2005 | Scheel et al. |
| 6,957,435 | B2 | 10/2005 | Armstrong et al. |
| 7,146,305 | B2 | 12/2006 | van der Made |
| 7,251,814 | B2 | 7/2007 | Armstrong et al. |
| 2001/0014905 | A1 | 8/2001 | Onodera |
| 2003/0014466 | A1 | 1/2003 | Berger et al. |
| 2003/0101440 | A1 | 5/2003 | Hardin et al. |
| 2005/0108711 | A1 | 5/2005 | Arnold et al. |

FOREIGN PATENT DOCUMENTS

| | | |
|---|---|---|
| JP | 07271738 | 10/1995 |
| JP | 10260850 | 9/1998 |
| JP | 2001188685 | 7/2001 |

OTHER PUBLICATIONS

T. L. Borden et al., "Multiple Operating Systems on One Processor Complex," IBM Systems Journal, vol. 28, No. 1, 1989, pp. 104-122.

Shigekazu Inohara et al., "A Thread Facility Based on User/Kernal Cooperation in the XERO Operating System," Computer Software and Applications Conference, Sep. 11, 1991, pp. 398-405.

Menasce, D. et al. "Capacity Planning and Performance Modeling," ISBN 0-13-035494-5, © 1994.

Leutenegger et al. "A Modeling Study of the TPC-C Benchmark," Proceedings of the 1993 ACM SIGMOD Int'l Conference on Management of Data, 1993, pp. 22-31.

Levine, C. "Order-of-Magnitude Advantage on TPC-C Through Massive Parallelism," Proceedings of the 1995 ACM SIGMOD Int'l Conference on Management of Data, 1995, pp. 464-465.

IBM Corporation, "AS/400 Logical Partitions Hardware Planning Guide," © 1999.

Schimunek, G. et al. "Slicing the AS/400 With Logical Partitioning: A How to Guide," Aug. 1999.

IBM Corporation, "LPAR Configuration and Management," First Editiion, © Apr. 2002.

Bakshi et al., "Partitioning and Pipelining for Performance-Constrained Hardware/Software Systems," 1999 IEEE, pp. 491-432.

Ayachi et al., "A Hierarchical Processor Scheduling Policy for Multiprocessor Systems," 1996 IEEE, pp. 100-109.

IBM Corporation, S/390 Processor Resource/Systems Manager Planning Guide (IBM Pub. No. GA22-7236-04, 5th Edition, Mar. 1999).

Marisa Gil, Xavier Martorell, Nacho Navarro; The Enhancement of a User-level Thread Package Scheduling on Multiprocessors; Sep. 1994; Euromicro Workshop on Parallel and Distributed Processing; pp. 228-236.

IBM AS/400e Logical Partitions: Learning About. © 1999, 2000. http://publib.boulder.ibm.com/pubs/html/as400/v4r5/ic2924/info/rzajx.pdf.

IBM AS/400e Logical Partitions: Planning for. © 1999, 2000. http://publib.boulder.ibm.com/pubs/html/as400/v4r5/ic2924/info/rzait.pdf.

IBM AS/400e Logical Partitions: Creating. © 1999, 2000. http://publib.boulder.ibm.com/pubs/html/as400/v4r5/ic2924/info/rzaj7.pdf.

IBM AS/400e Logical Partitions: Managing. © 1999, 2000. http://publib.boulder.ibm.com/pubs/html/as400/v4r5/ic2924/info/rzaj6.pdf.

IBM AS/400e Logical Partitions: Troubleshooting. © 1999, 2000. http://publib.boulder.ibm.com/pubs/html/as400/v4r5/ic2924/info/rzaj8.pdf.

Abraham Silberschatz and peter Baer Galvin, "Operating System Concepts," 1999, John Wiley & Sons, Fifth Edition, pp. 74-75.

Shiki Okasaka et al., "Design and Implementation of a Thread Mechanism Based on User/Kernel Cooperation," vol. 34, No. 4, Information Processing Society of Japan, Transactions of Information Processing Society of Japan, Apr. 15, 1995.

Anonymous, "Pthreads Overview (for LC)," Feb. 16, 2000, retrieved from https://computing.llnl.gov on Mar. 24, 2008.

Anonymous, "HP OpenVMS Systems," Sep. 1, 1999, retrieved from Http://h71000.www7.hp.com on Mar. 24, 2008.

U.S. Patent and Trademark Office, Notice of Allowance issued in related U.S. Appl. No. 09/939,232, dated May 6, 2008.

U.S. Patent and Trademark Office, Office Action issued in related U.S. Appl. No. 09/939,232, dated Apr. 1, 2008.

U.S. Patent and Trademark Office, Board of Patent and Interferences Decision, Examiner Reversed in related U.S. Appl. No. 09/939,232, dated Mar. 7, 2008.

U.S. Patent and Trademark Office, Examiner's Answer to Appeal Brief issued in related U.S. Appl. No. 09/939,232, dated Oct. 31, 2006.

U.S. Patent and Trademark Office, Final Office Action issued in related U.S. Appl. No. 09/939,232, dated Feb. 15, 2006.

U.S. Patent and Trademark Office, Office Action issued in related U.S. Appl. No. 09/939,232, dated Sep. 6, 2005.

U.S. Patent and Trademark Office, Final Office Action issued in related U.S. Appl. No. 09/939,232, dated Mar. 9, 2005.

U.S. Patent and Trademark Office, Office Action issued in related U.S. Appl. No. 09/939,232, dated Oct. 22, 2004.

SYSTEM FOR YIELDING TO A PROCESSOR

CROSS-REFERENCE TO RELATED APPLICATIONS

This application is a continuation of U.S. patent application Ser. No. 09/939,232, filed on Aug. 24, 2001 by William Joseph Armstrong et al. (ROC920000314US1), the entire disclosure of which is incorporated by reference herein.

FIELD OF THE INVENTION

The present invention relates to computing systems, and more particularly, to yielding processors within a logically-partitioned environment where partitions are sharing central processing units (CPUs).

BACKGROUND OF THE INVENTION

The speed and efficiency of many computing applications depends upon the availability of processing resources. To this end, computing architectures such as the "virtual machine" design, developed by International Business Machines Corporation, share common processing resources among multiple processes. Such an architecture may conventionally rely upon a single computing machine having one or more physical controllers, or central processing units (CPUs). The CPUs may execute software configured to simulate multiple virtual processors.

Such multiprocessor environments support the conceptual practice of logical "partitioning." Partitioning provides a programmed architecture suited for assignment and sharing computing assets. A partition may logically comprise a portion of a machine's CPUs, memory and other resources, as assigned by an administrator. As such, an administrator may allocate the same resources to more than one partition. Each partition may additionally host an operating system, in addition to multiple virtual processors. In this manner, each partition operates largely as if it is a separate computer.

In principle, each virtual processor may access many of the physical resources of the underlying physical machine. Exemplary resources may include memory assets and hardware registers, in addition to the CPUs. Virtual processors may additionally share a priority scheme or schedule that partially dictates allocation of processing cycles as between different virtual processors. An underlying program called a "hypervisor," or partition manager, may use this scheme to assign and dispatch CPUs to each virtual processor. For instance, the hypervisor may intercept requests for resources from operating systems to globally share and allocate them.

In this manner, virtual processors act as logical threads of execution for a host partition. As such, the virtual processors can separately execute instructions, while sharing resources. By duplicating the utilization of some physical assets, a partitioned environment can promote better performance and efficiency. The programmable flexibility of partitions may further allow them to respond to changes in load dynamically without rebooting. For example, each of two partitions containing ten virtual processors may take over all ten CPUs of a shared physical system as workload shifts without requiring a re-boot or operator intervention.

To promote proportionate resource allocation, an administrator may place constraints on the number of resources accessible by a virtual processor. For instance, the hypervisor may never dispatch more than fifty percent of available CPUs to a certain virtual processor. Similarly, the hypervisor may ensure that a virtual processor's use of a CPU does not exceed a specified duration. In this manner, the virtual processor may be allocated a "time slice" of a CPU, at the expiration of which, the hypervisor may preempt the virtual processor's use of the CPU. Through similar programming, a complex application can theoretically be distributed among many processors instead of waiting to be executed by a single processor.

However, despite the flexibility afforded by such multiprocessing systems, complications associated with resource allocation persist. Some such obstacles arise from the dynamic, intertwined processing requirements of operating systems. For example, the initialization of certain virtual processes may be premised upon the prior execution of other processes. Such dependency may introduce its own complexity and inefficiency into a multiprocessing application. In a shared processor environment, the same obstacles can arise for virtual processors. For instance, a hypervisor may assign a CPU to a virtual processor that is requesting a spin-lock while waiting for a prerequisite virtual processor which is holding the spin-lock to obtain its own CPU. As such, not only is the assigned CPU unable to execute the virtual processor, but it is prevented from executing other virtual processors within the partition.

Some administrators attempt to address multiprocessor inefficiency by introducing programmed yield functions. For instance, a virtual processor may issue a yield-to-active command to the hypervisor whenever the virtual processor is about to spin. A virtual processor may "spin" as it waits for a prerequisite process to execute or a resource to become available. Since the holder of the resource may not be active, the virtual processor would be wasting CPU cycles while it is spinning. In response to the yield-to-active command, the virtual processor may enter a yielded state and relinquish its CPU. The hypervisor may reallocate the yielded CPU to the next virtual processor presented on the schedule.

While such a technique represents an improvement in managing resources, it nonetheless tolerates inefficiency. Namely, yielding processes must often remain inactive for extended periods while waiting for the hypervisor to sequentially allocate CPUs to all other virtual processors. Compounded over multiple processing layers and iterations, such inactivity translates into slow processing speeds and inefficiency. Consequently, there is a need for a more effective manner of managing physical computing resources.

SUMMARY OF THE INVENTION

One embodiment consistent with the principles of the present invention includes an apparatus and program product configured to yield a CPU within a logically partitioned data processing system. Such a system may support a plurality of virtual processors. As such, the embodiment may initiate a request from a yielding virtual processor. The request may prompt a yield of a CPU controlled by the yielding virtual processor. More particularly, the request may designate a target virtual processor from among the plurality of virtual processors. For instance, the signal may contain pointer and/or status information regarding the target processor.

The target virtual processor may require access to the CPU that the yielding virtual processor controls and requests to yield. The embodiment may then logically reassign, or "switch-in," control of the CPU from the yielding virtual processor to the target virtual processor. Prior to dispatching the CPU to the target virtual processor, the hypervisor may verify that the yielding virtual processor is still inactive, and that the target virtual processor is further not in a state of yield, itself. The hypervisor may further save the state of the yielding hypervisor prior to passing control to a dispatcher.

The above and other objects and advantages of the present invention shall be made apparent from the accompanying drawings and the description thereof. Program code may store the state of the yielding virtual processor.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

An embodiment of the present invention may include an apparatus, program product and method for coordinating and redistributing CPUs as among logically-partitioned virtual processors. The embodiment may yield a CPU to precipitate an occurrence upon which its own execution may be predicated. Generally, the embodiment may coordinate virtual processor execution by efficiently yielding CPUs to targeted virtual processors.

More particularly, a yielding virtual processor may determine and designate a "target" virtual processor. An exemplary target processor may need a CPU held by the yielding virtual processor. The targeted processor may further embody a condition required prior to execution of the yielding processor. The yield feature of the embodiment may enable a hypervisor to allocate a CPU or memory resource surrendered by the yielding processor to the designated virtual processor. In enabling the target processor, the method of the embodiment may obviate the condition preventing execution of the yielding processor. An environment suited for execution of such an embodiment is illustrated in FIGS. 1 and 2.

Hardware and Software Environment

Figure 1:
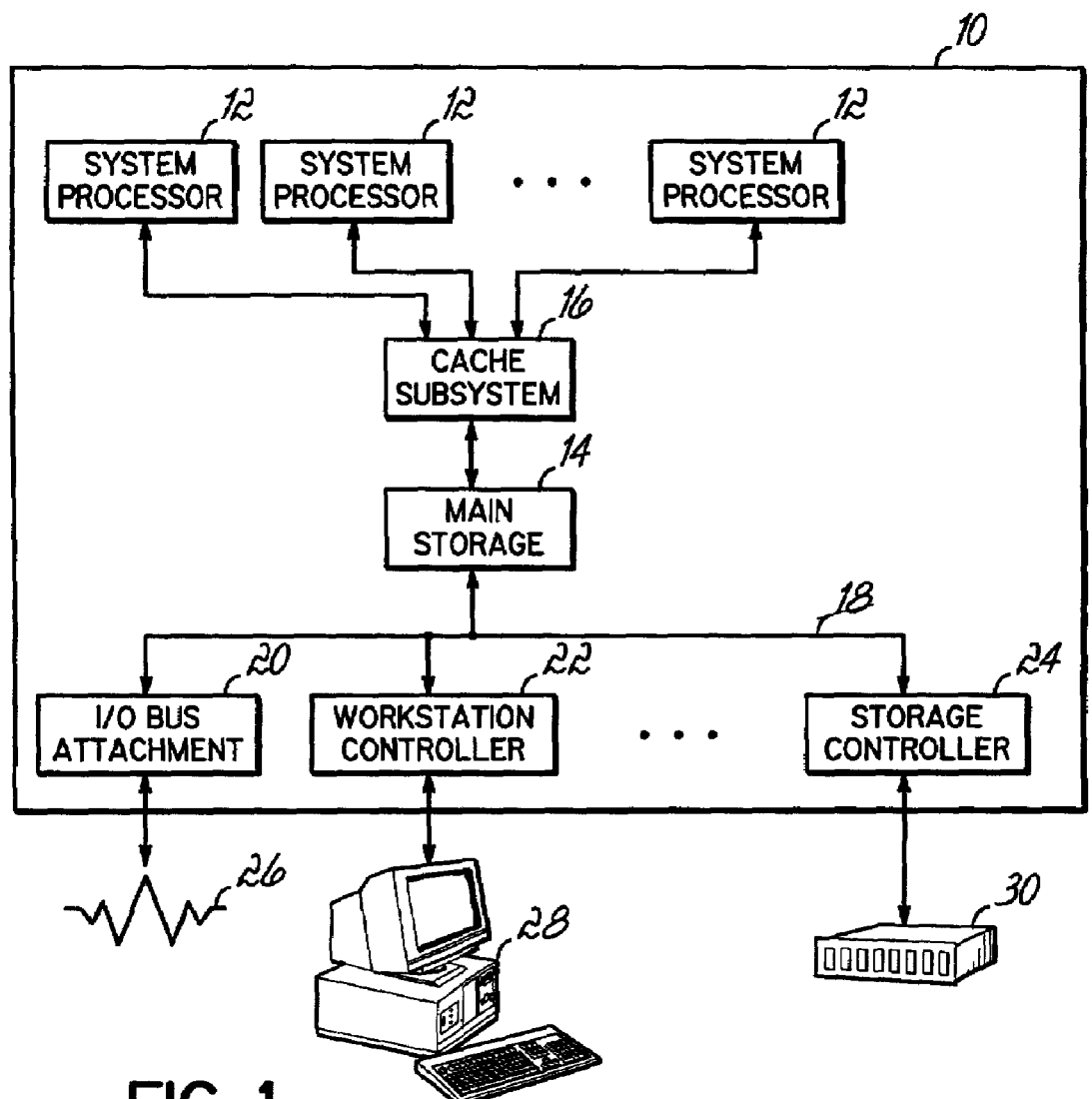
FIG. 1 is a block diagram of a computer consistent with the invention.
Figure 2:
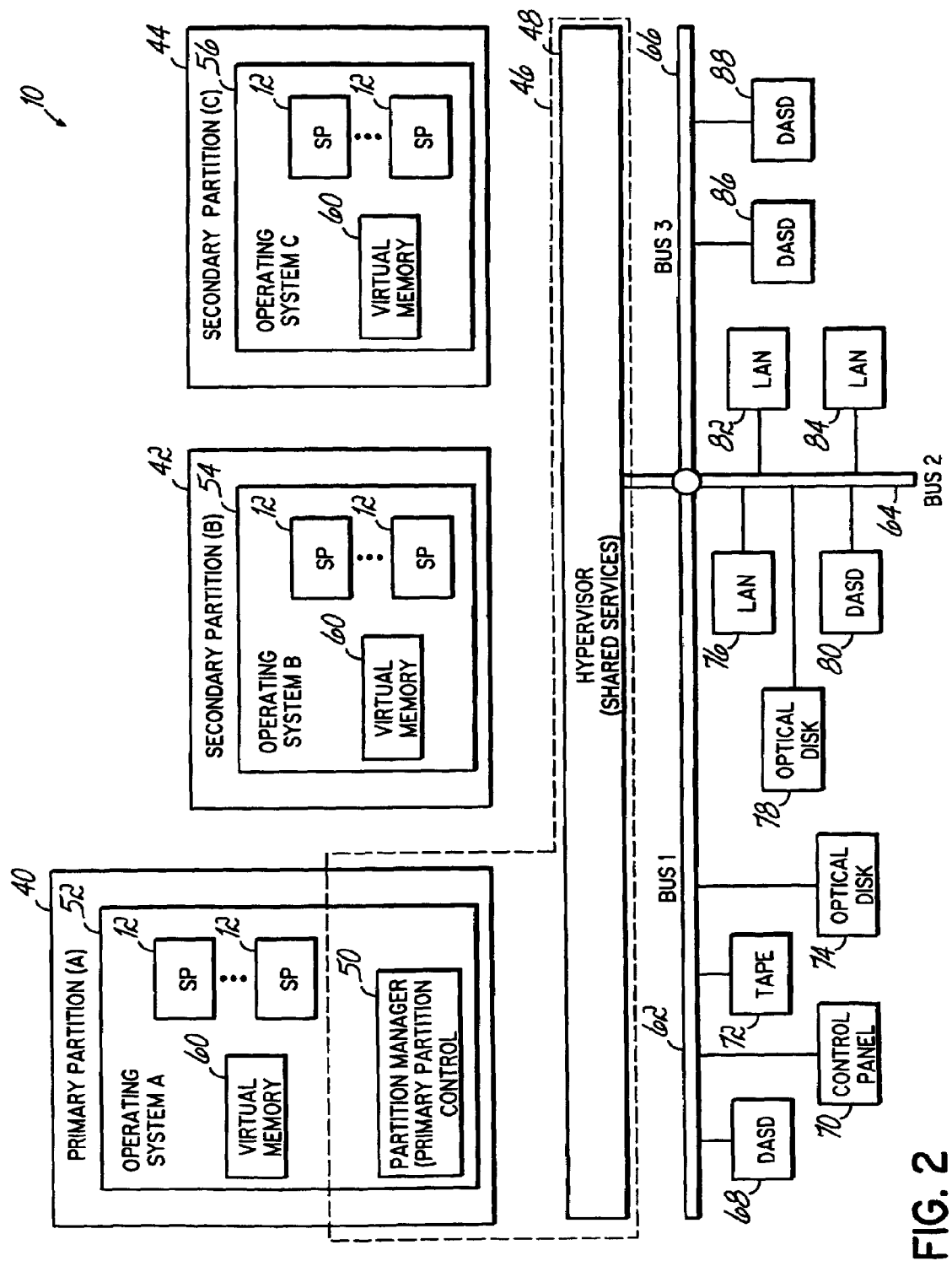
FIG. 2 is a block diagram of the primary software components and resources in the computer of FIG. 1.

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 or e series computer available from International Business Machines Corporation.

Apparatus 10 generally includes one or more system processors 12 coupled to a memory subsystem including main storage 14, e.g., an array of dynamic random access memory (DRAM). Also illustrated as interposed between processors 12 and main storage 14 is a cache subsystem 16, typically including one or more levels of data, instruction and/or combination caches, with certain caches either serving individual processors or multiple processors as is well known in the art. Furthermore, main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

FIG. 2 illustrates in greater detail the primary software components and resources utilized in implementing a logically partitioned computing environment on computer 10, including a plurality of logical partitions 40, 42, 44 managed by a partition manager or hypervisor 46. Any number of logical partitions may be supported as is well known in the art.

In the illustrated implementation, logical partition 40 operates as a primary partition, while logical partitions 42 and 44 operate as secondary partitions. A primary partition in this context shares some of the partition management functions for the computer, such as handling the powering on or powering off of the secondary logical partitions on computer 10, or initiating a memory dump of the secondary logical partitions. As such, a portion of hypervisor 46 is illustrated by primary partition control block 50, disposed in the operating system 52 resident in primary partition 40. Other partition management services, which are accessible by all logical partitions, are represented by shared services block 48. However, partition management functionality need not be implemented within any particular logical partition in other implementations consistent with the invention.

Each logical partition utilizes an operating system (e.g., operating systems 52, 54 and 56 for logical partitions 40, 42 and 44, respectively), that controls the primary operations of the logical partition in the same manner as the operating system of a non-partitioned computer. Each logical partition 40-44 executes in a separate memory space, represented by virtual memory 60. Moreover, each logical partition 40-44 is statically and/or dynamically allocated a portion of the available resources in computer 10. For example, each logical partition may share one or more processors 12, as well as a portion of the available memory space for use in virtual memory 60. In this manner, a given processor may be utilized by more than one logical partition. Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to primary logical partition 40. Bus 64, on the other hand, may have resources allocated on a resource-by-resource basis, e.g., with local area network (LAN) adaptor 76, optical disk drive 78 and DASD 80 allocated to secondary logical partition 42, and LAN adaptors 82 and 84 allocated to secondary logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs", or simply "programs". The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Yield-to-Processor Function

Figures 3, 4:
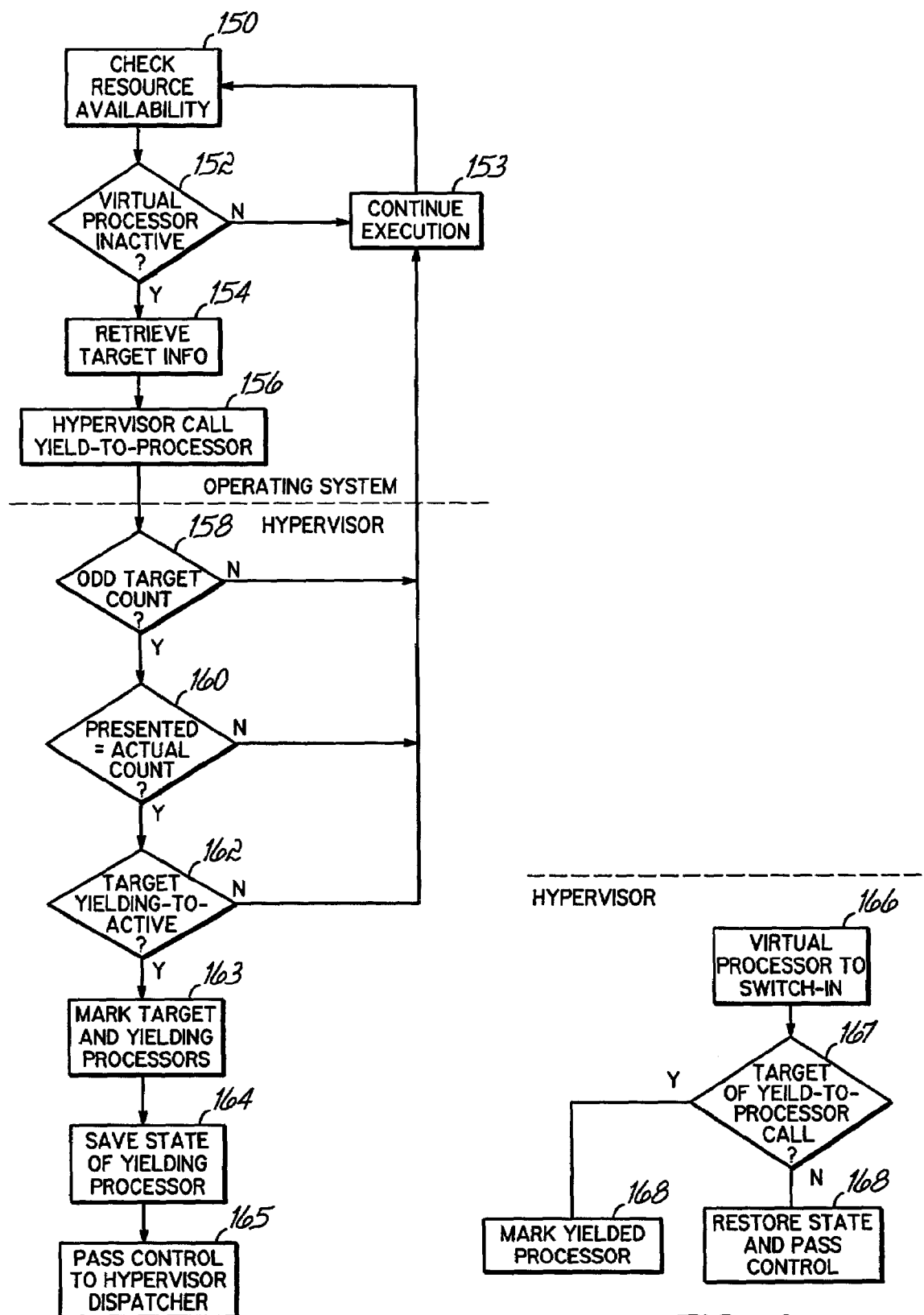
FIG. 3 is a flowchart embodying one method of redistributing CPUs among partitions supported within the environments of FIGS. 1 and 2.
FIG. 4 is a flowchart illustrating sequenced steps associated with a process step of FIG. 3.

The flowchart of FIG. 3 illustrates exemplary embodiments for yielding a CPU within the hardware and software environments of the first two figures. Generally, the illustrated process steps coordinate virtual processor execution by efficiently yielding CPUs. In the embodiment of FIG. 3, a yielding virtual processor may determine and designate a "target" virtual processor. Of note, the target processor may be located within the same partition as the yielding virtual processor. In one instance, a target virtual processor may desire a CPU controlled by the yielding virtual processor. The targeted virtual processor may further embody a condition required prior to execution of the yielding virtual processor.

The yield feature of this embodiment may enable a hypervisor or partition manager to reallocate a CPU or memory resource that has been surrendered by a yielding operating system. In this manner, the hypervisor may enable a target virtual processor, alleviating the condition preventing execution of the yielding virtual processor. Of note, the targeting function of the embodiment represents a departure from conventional management applications that indiscriminately strip and reassign yielded resources. As discussed above, the inability of such prior art applications to focus on target yielding operations can translate into substantial processing delays.

At block 150 of FIG. 3, a virtual processor of a partition may recognize that it has been assigned a CPU by the hypervisor. After registering that it has a CPU available to it, the virtual processor may evaluate at block 152 whether it is able to utilize the allocated CPU. More particularly, the virtual processor may assess a spin-lock to determine if it is currently available. For example, the hypervisor may have dispatched a CPU to the virtual processor while it was spinning on a lock held by another virtual processor. In another instance, the hypervisor may have time-sliced or otherwise preempted the virtual processor's access to the dispatched CPU.

Should such a condition be detected at block 152 of FIG. 3, the embodiment may retrieve and store information at block 154 that pertains to a "target" virtual processor located within the same partition. An exemplary target virtual processor may require a CPU controlled by the yielding virtual processor. The yielding virtual processor, in turn, may be logically dependent upon execution of the target virtual processor. As such, the yielding virtual processor is said to be waiting for the target virtual processor to execute.

Information retrieved from the target virtual processor at block 154 of FIG. 3 may include an address and target count for the target virtual processor. A target count may relate to a value assigned to a storage component of each virtual processor. Although discussed below in detail, one embodiment may maintain and use such target counts to determine processing statuses. The hypervisor may incrementally increase the target count of a virtual processor in response to a programmed occurrence. For instance, the hypervisor may increase the target count by one increment every time a virtual processor yields or is preempted.

In one embodiment, such an addition may render the count an odd value. Likewise, the hypervisor may incrementally increase a target count whenever a virtual processor begins executing. This increment may return the target count of a virtual processor to an even number. Thus, even target counts may correspond to virtual processors having their resource requirements fulfilled (i.e., having a physical processor).

Information pertaining to the target virtual processor, which includes the above discussed target count, may be available to both a yielding virtual processor and the hypervisor. One architecture may allow all virtual processors in a partition access to such information in a shared memory location. At block 156 of FIG. 3, an operating system or a yielding virtual processor may transmit a "yield-to-processor" call signal to the hypervisor. The call may include a snapshot of the information sampled from the target processor at block 154. As such, the snapshot may comprise both a target count and an address for the target virtual processor. In this manner, the hypervisor may evaluate the target count presented within the call at block 158. Of note, the dashed line bisecting FIG. 3 demarcates the roles performed by the hypervisor and the operating system. More particularly, the operating system initiates the illustrative steps of block 150-156, while the hypervisor executes blocks 158-165.

As discussed above, if the yield count of the target virtual processor is determined at block 158 to be even, then the hypervisor may have already dispatched a CPU to the target virtual processor subsequent to the virtual processor's yielding at block 156. Because the condition of the yield may have been thus satisfied, there may no longer be a need for the yielding virtual processor to surrender its own CPU. For instance, execution of the target virtual processor may have lifted a lock mechanism that previously inhibited execution of the yielding virtual processor. Consequently, an even target count may cause the embodiment to re-evaluate at block 150 whether the yielding virtual processor is, in fact, still spinning. Of note, the yield call made by the virtual processor at block 156 may cause the hypervisor to adjust the yield count of the virtual processor, accordingly. As addressed below, this feature may impact other virtual processors that may designate, or target, the yielding virtual processor.

Should an odd target count be detected at block 158 of FIG. 3, the hypervisor may compare the target count presented within the yield call with that of an actual target count at block 160. The hypervisor may obtain the actual target count by sampling a target virtual processor field or hardware register at the instant the yield call is received. The comparison step of block 160 may ensure that the target virtual processor has not acquired a needed CPU since the virtual processor made the call to yield. Under such a scenario, the target count presented in the call will not match the count verified by the hypervisor. Consequently, the hypervisor may cause the yielding virtual processor to re-evaluate its status back at block 150.

Conversely, should the presented yield count match the sampled, actual count at block 160, then the hypervisor may recognize that the target virtual processor, in fact, requires a CPU. Prior to reallocating CPUs, however, the hypervisor may ensure that the target virtual processor is not in "yield-to-active" call. The target processor may have made a conventional yield-to-active call, requiring it to surrender resources until all unyielding virtual processors are serviced. Under such a circumstance, yielding to a yielding target virtual processor can be circular and counter-productive, stalling system performance. Thus, the precautionary step of block 162 may prevent a functional loop from forming in a given application. As such, the embodiment may abort the yield-to-processor call of block 156 at block 153. Of note, this feature of the embodiment further allows the yield program of the present embodiment to execute within the confines of prior art yield applications.

At block 163 of FIG. 3, the hypervisor may designate, or "mark" storage corresponding to the yielding virtual processor as waiting for the target processor. The storage for the virtual processors is allocated out of hypervisor storage. As such, the hypervisor may additionally mark storage corresponding to the target processor as having the yielding processor waiting for it. After delineating the respective relationships between the target and virtual processor at block 163, the hypervisor may store the state of the operating system of the yielding virtual processor at block 164.

For instance, the embodiment may record at block 164 all registers associated with the virtual processor such that all conditions of the virtual processor are satisfied and preserved. In this manner, the stored virtual processor merely waits for a CPU. That is, the hypervisor may recall the preserved state of the yielding virtual processor such that the operating system may execute as soon as all logical and physical conditions are satisfied. Such conditions may include both prerequisite processor executions and CPU assignments.

At block 165 of FIG. 3, the hypervisor passes control to the hypervisor dispatcher. A hypervisor dispatcher may coordinate pieces of code corresponding to the virtual processors of a partition to determine which virtual processor will run next on a given CPU. For instance, the hypervisor dispatcher may manipulate a resource-allocation schedule in such a manner as to cause the target virtual processor may presently receive a time-slice of the next available CPU. After the dispatcher of the hypervisor has determined, as discussed below in detail, to "switch-in" the target processor, the hypervisor may dispatch the CPU to the target virtual processor. In this manner, the target processor may finally execute, alleviating the conditional lock placed on the virtual processor.

The flowchart of FIG. 4 illustrates process steps consistent with those executed by the hypervisor dispatcher at block 165 of FIG. 3. More particularly, the flowchart shows steps that the dispatcher must make to determine whether it will switch-in a given target processor onto a CPU resource. Namely, the hypervisor must execute blocks 165-168 to ensure that a virtual processor to be allocated a CPU is the target of a yield-to-processor call.

As such, the hypervisor at block 166 instructs the dispatcher circuitry to initiate an appropriate evaluation process of all virtual processors presented to it. The hypervisor may trigger such processes by indicating to the dispatcher that a switch-in procedure is imminent. In response, the hypervisor dispatcher may examine the storage of the virtual at block 167 to determine whether a presented virtual processor is a target of a yield-to-processor call.

Should the condition of block 167 be thus satisfied, then the hypervisor may mark the storage of the yielded processor as being ready-to-run at block 169. The hypervisor encodes or designates the yielding processor in this manner because the condition for which it originally yielded, i.e., execution of the target processor condition, has been satisfied. As such, the yielded virtual processor need only wait for a CPU to become available via the hypervisor.

The yielding processor thus coded, the hypervisor at block 168 may place the state and associated registers of the virtual processor onto the hardware (CPU), and return control back to the partition. Of note, if the virtual processor evaluated at block 167 is not the target of a yield-to-processor call, then the state of that virtual processor is restored at block 168, and control is passed to the partition. As such, the hypervisor does not alter the status of the yielded virtual processor, as its yielding condition remains unsatisfied.

While the present invention has been illustrated by a description of various embodiments and while these embodiments have been described in considerable detail, it is not the intention of the applicants to restrict, or in any way limit, the scope of the appended claims to such detail.

Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus comprising:
a logically partitioned computer including a plurality of logical partitions, a first of which including a plurality of virtual processors used to schedule threads and that share at least one CPU; and
a program resident in a hypervisor of the computer, wherein the program is configured to assign and dispatch the CPU to the plurality of virtual processors, the program configured to initiate a request for a yield of the CPU controlled by a yielding virtual processor, wherein the request designates a target virtual processor from among the plurality of virtual processors; and further configured to logically reassign control of the CPU from the yielding virtual processor to the target virtual processor.

2. The apparatus according to claim 1, wherein the target virtual processor requires access to the CPU, wherein the yielding virtual processor controls the CPU.

3. The apparatus according to claim 1, wherein the program initiates generation of a yield command from the virtual processor, wherein the yield command includes pointer and status information regarding the target virtual processor.

4. The apparatus according to claim 1, wherein the program initiates an assignment of a target count to the target virtual processor.

5. The apparatus according to claim 4, wherein the program initiates a comparison of the target count to a presented count conveyed in the request for the yield.

6. The apparatus according to claim 1, wherein the program initiates abandonment of the yield in response to a yield-to-active command.

7. The apparatus according to claim 1, wherein the program initiates a designation of the yielding virtual processor as waiting for the target virtual processor.

8. The apparatus according to claim 1, wherein the program designates the target virtual processor as having a yielding processor waiting for the yielding virtual processor.

9. The apparatus according to claim 1, wherein at least one of the virtual processors of the plurality of virtual processors includes a schedule used to determine allocation as between the plurality of virtual processors of processing cycles of the CPU.

10. A program product, comprising:
a program resident in a hypervisor configured to assign and dispatch a CPU to a plurality of virtual processors used to schedule threads, wherein the program is further configured to initiate a request for a yield of the CPU controlled by a yielding virtual processor among a plurality of virtual processors in a logically partitioned data processing system, wherein the request designates a target virtual processor from among the plurality of virtual processors; and further configured to logically reassign control of the CPU from the yielding virtual processor to the target virtual processor; and
a non-transitory recordable type medium bearing the program.

* * * * *